United States Patent [19]
Wong et al.

[11] Patent Number: 5,592,111
[45] Date of Patent: Jan. 7, 1997

[54] CLOCK SPEED LIMITER FOR AN INTEGRATED CIRCUIT

[75] Inventors: Keng L. Wong, Portland; Alexander Waizman, Beaverton, both of Oreg.; Bart R. McDaniel, Phoenix, Ariz.

[73] Assignee: Intel Corporation, Santa Clara, Calif.

[21] Appl. No.: 355,859

[22] Filed: Dec. 14, 1994

[51] Int. Cl.[6] .............................. G01R 23/02; H03D 3/00
[52] U.S. Cl. .............. 327/45; 327/42; 327/291; 327/48
[58] Field of Search ................ 327/39, 42, 44, 327/47, 45, 48, 113, 114, 175, 77, 78, 83, 172, 182, 142, 156, 365, 291, 175, 87, 67

[56] References Cited

U.S. PATENT DOCUMENTS

| | | | |
|---|---|---|---|
| 3,764,992 | 10/1973 | Milne | 340/172.5 |
| 3,831,113 | 8/1974 | Ahmed | 327/291 |
| 3,852,616 | 12/1974 | Carp et al. | 327/42 |
| 3,906,247 | 9/1975 | Heffner | 327/172 |
| 3,990,007 | 11/1976 | Hohhof | 327/48 |
| 4,063,308 | 12/1977 | Collins et al. | 364/200 |
| 4,263,565 | 4/1981 | Astle | 327/175 |
| 4,359,649 | 11/1982 | Mündel | 327/172 |
| 4,380,746 | 4/1983 | Sun et al. | 327/182 |
| 4,447,870 | 5/1984 | Tague et al. | 364/200 |
| 4,564,837 | 1/1986 | Awano | 327/39 |
| 4,615,005 | 9/1986 | Maejima et al. | 364/200 |
| 5,086,387 | 2/1992 | Arroyo et al. | 395/550 |
| 5,089,955 | 2/1992 | Morinaga et al. | 395/800 |
| 5,101,127 | 3/1992 | Simpson | 307/518 |
| 5,107,523 | 4/1992 | Heaney et al. | 377/2 |
| 5,180,935 | 1/1993 | Abdi et al. | 327/42 |
| 5,274,337 | 12/1993 | Young et al. | 328/138 |
| 5,280,605 | 1/1994 | Young et al. | 395/550 |
| 5,440,254 | 8/1995 | Sundby | 327/79 |

*Primary Examiner*—Toan Tran
*Attorney, Agent, or Firm*—Blakely, Sokoloff, Taylor & Zafman

[57] ABSTRACT

A speed governor for an integrated circuit which prevents the operation of the integrated circuit above a selected frequency. The speed governor generates a frequency reference and compares the frequency reference to the frequency of the external clock signal that clocks the integrated circuit. As a result of the comparison, if the frequency of the input clock signal is greater than the frequency reference then operation of the integrated circuit is disrupted.

37 Claims, 8 Drawing Sheets

CLOCK SPEED LIMITER FOR AN INTEGRATED CIRCUIT

FIELD OF THE INVENTION

The field of the invention relates to the field of governing the speed at which a computer may run; more particularly, the present invention relates to disabling the operation of an integrated circuit when the input clock signal exceeds an upper limit.

BACKGROUND OF THE INVENTION

In some computers systems, the need may arise to disable the computer when an input clock signal exceeds an upper limit. For instance, using a clock that is too fast may cause problems in a system, since some of the components in the system may not be able to operate at the higher frequency.

In the fabrication of microprocessors, it is common to find out that some of the microprocessors are able to operate at higher frequencies than others even though all are fabricated with the same processor. Process variations affecting, for example, the thickness of oxides can cause some wafer runs to yield parts that operate at much higher frequencies than in other wafer runs. Some companies test the upper frequency performance of newly fabricated microprocessors and sort them into "frequency" bins. Consequently, some microprocessors when sold are graded (and labeled) for higher frequencies than others. The microprocessor may not function properly for frequencies above its labeled frequency, especially under stressful ambient conditions or marginal power supply potential.

Companies have found that parts labeled with one frequency are sometimes relabeled after being sold by the manufacturer with higher frequencies, and then resold. These relabeled parts could end up in computer systems sold to operate at higher frequencies than the manufacturer intended. An innocent purchaser of such a computer could find that the computer operates well part of the time but fails at other times. The failures may be difficult to trace, and if traced to the microprocessor, reflect badly on the manufacturer.

At least one manufacturer has incorporated a speed governor in its microprocessors which cause the microprocessors to fail if the clocking signals applied to them are higher than the frequency they were originally sold for. When this is done, the microprocessor could never be used in higher frequency applications since it will never operate at the higher frequencies.

In U.S. Pat. No. 5,107,523, entitled "Processor Clock Governor", issued Apr. 21, 1992 and assigned to the assignee to the present invention, a circuit is described for disabling a microprocessor when a clock with an improper frequency is used. A problem with this circuit is that the manner in which the "kill" signal is generated is itself subject to process variations and hence may not be settable with the precision desired.

In U.S. Pat. Nos. 5,280,605 and 5,274,337, a clock speed limiter is disclosed and uses an integrated resistor as the basis for a timing reference. The resistance value is sensitive to temperature variation, which makes the timing reference variable with temperature. In other words, because the resistance value is sensitive to temperature variation, the cut-off frequency is not constant with temperature, making it difficult to set a reliable cut-off value without losing yield.

As will be disclosed, the present invention provides a circuit that is substantially independent of temperature and process variation and additionally provides other advantages.

SUMMARY OF THE INVENTION

A method and apparatus for regulating the operating speed of an integrated circuit is described. The method and apparatus of the present invention comprises a timing reference generator and a comparison circuit. The timing reference generator generates a timing reference. The comparison circuit compares the timing reference to the input clock signal and generates a disable signal to disable the integrated circuit when the frequency of the input clock signal is greater than the reference frequency.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

A clock speed limiter for an integrated circuit is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Overview of the Present Invention

The present invention provides an apparatus and method to prevent an integrated circuit from operating above a predetermined frequency. The present invention employs a frequency reference to determine whether the clock signal that is currently clocking the integrated circuit device is too fast. That is, frequency reference is used as a basic timing reference against which the external input clocks frequency is compared. In one embodiment, the timing reference is generated on-chip.

In one embodiment, the comparison between the timing reference and the input clock is implemented in digital circuitry. The digital circuitry counts the number of external clock cycles which occur during a period of the reference frequency. This count is directly proportional to the frequency to the external clock. The count is then compared against a predetermined value that is indicative of the speed allowed for the integrated circuit. In one embodiment, this value is stored in a read-only memory (ROM). If the count exceeds the value stored, a violation has occurred.

The predetermined frequency that is compared against the frequency of the external input clock is temperature insensitive. In the present invention, two temperature insensitive references are used to generate the frequency reference: a bandgap voltage reference and a constant current reference. By sourcing the constant current to a gate capacitor, a voltage ramp is obtained. The voltage ramp is terminated when it reaches the level of the bandgap reference output. Using this configuration, a constant and slow frequency reference is obtained in the integrated circuit (e.g., microprocessor). It should be noted that using the constant voltage and the constant current produces a constant resistance that will be temperature insensitive.

An on-chip ROM may contain several entries to allow the same integrated circuit to be programmed for different speeds. In one embodiment, programming is done by bondpad options.

Frequency Reference Circuitry

Figure 1:
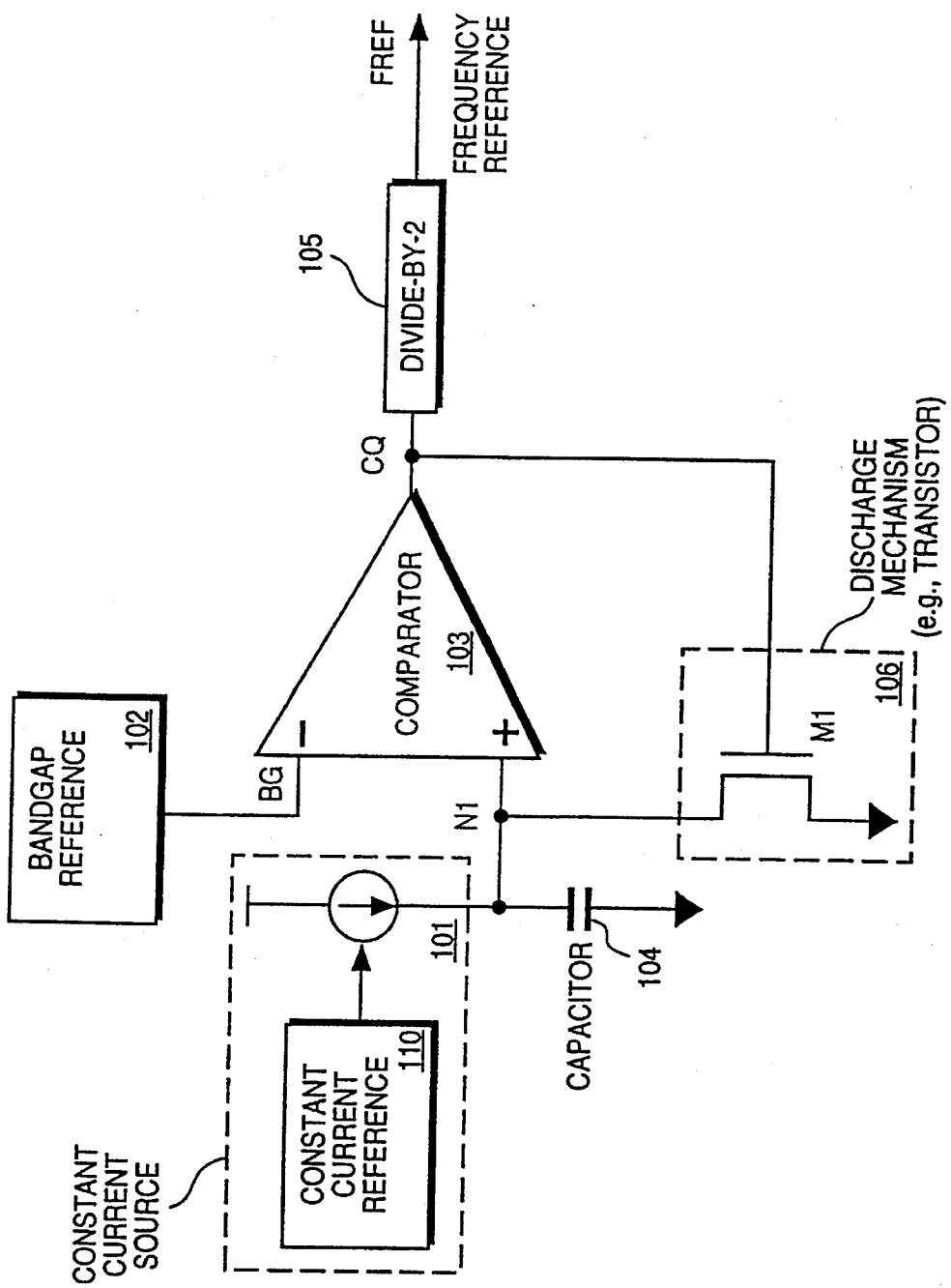
FIG. 1 illustrates one embodiment of the frequency reference generator.

FIG. 1 illustrates a block diagram of one embodiment of the frequency reference generator of the present invention. Referring to FIG. 1, the frequency reference generator comprises a constant current source 101 for generating a constant current using a constant current reference 110. The constant current source 101 is coupled to capacitor 104 to charge capacitor 104. Capacitor 104 is also coupled to ground. The charge generated by capacitor 104 represents the N1 input voltage to one side of comparator 103. The other input to comparator 103 is bandgap reference 102 which establishes the trip point for the comparator 103. Capacitor 104 is also coupled to a discharge mechanism (e.g., transistor) 106 for discharging capacitor 104. The output of comparator 103 is coupled to the input of a divide-by-2 105. The output of comparator 103 is also fed back to control the discharge mechanism 106. In one embodiment, where discharge mechanism 106 comprises a transistor, the output of comparator 103 is coupled to the gate of the transistor as an on/off switch. The output of divide-by-2 105 is the frequency reference FREF.

Bandgap reference 102 establishes a trip point reference BG for comparator 103. Comparator 103 constantly compares the voltage difference between the BG and N1 inputs. The N1 input potential is charged up gradually from ground at a constant rate as determined by constant current source 101 and capacitor 104. Note capacitor 104 is also a constant value. When the potential at the N1 input exceeds the BG input, the output (CQ) of comparator 103 flips, turning on the strong discharge mechanism 106. This causes the input N1 to be pulled to ground very quickly, which immediately causes the output of comparator 103 to flip back to ground. This sequence of events is repeated indefinitely, producing a stable frequency at CQ (the output of comparator 103). The output of comparator 103 is divided by two to produce a frequency reference output FREF, which is stable and independent of temperature.

Figure 2:
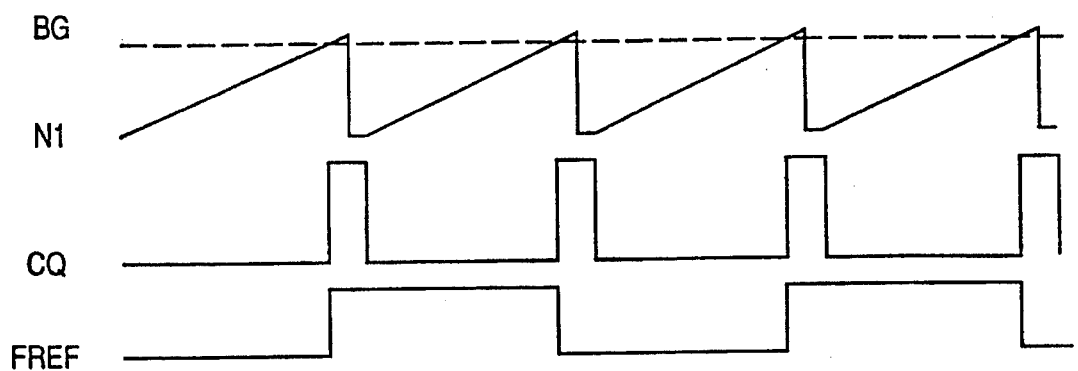
FIG. 2 are waveform diagrams that depict the operation of the frequency reference generator.

An example of analog waveforms generated by the frequency reference generator of the present invention are shown in FIG. 2. Referring to FIG. 2, the N1 input is shown as a constant voltage ramp which increases until slightly beyond the bandgap reference. At that time, the N1 device is discharged back to ground, while the CQ pulse occurs. In one embodiment, the discharge of the N1 device begins in the middle of each CQ pulse (i.e., the delay from the rising edge of the CQ pulse to the falling edge of the N1 device discharge curve equals the delay from the falling edge of the discharge curve of the N1 device to the falling edge of the CQ pulse. The pulse width of the CQ is very small when compared to the period of the frequency reference FREF. Note that the voltage ramp actually exceeds the bandgap reference level slightly, but the discharge mechanism quickly returns the potential at N1 to ground.

Figure 3:
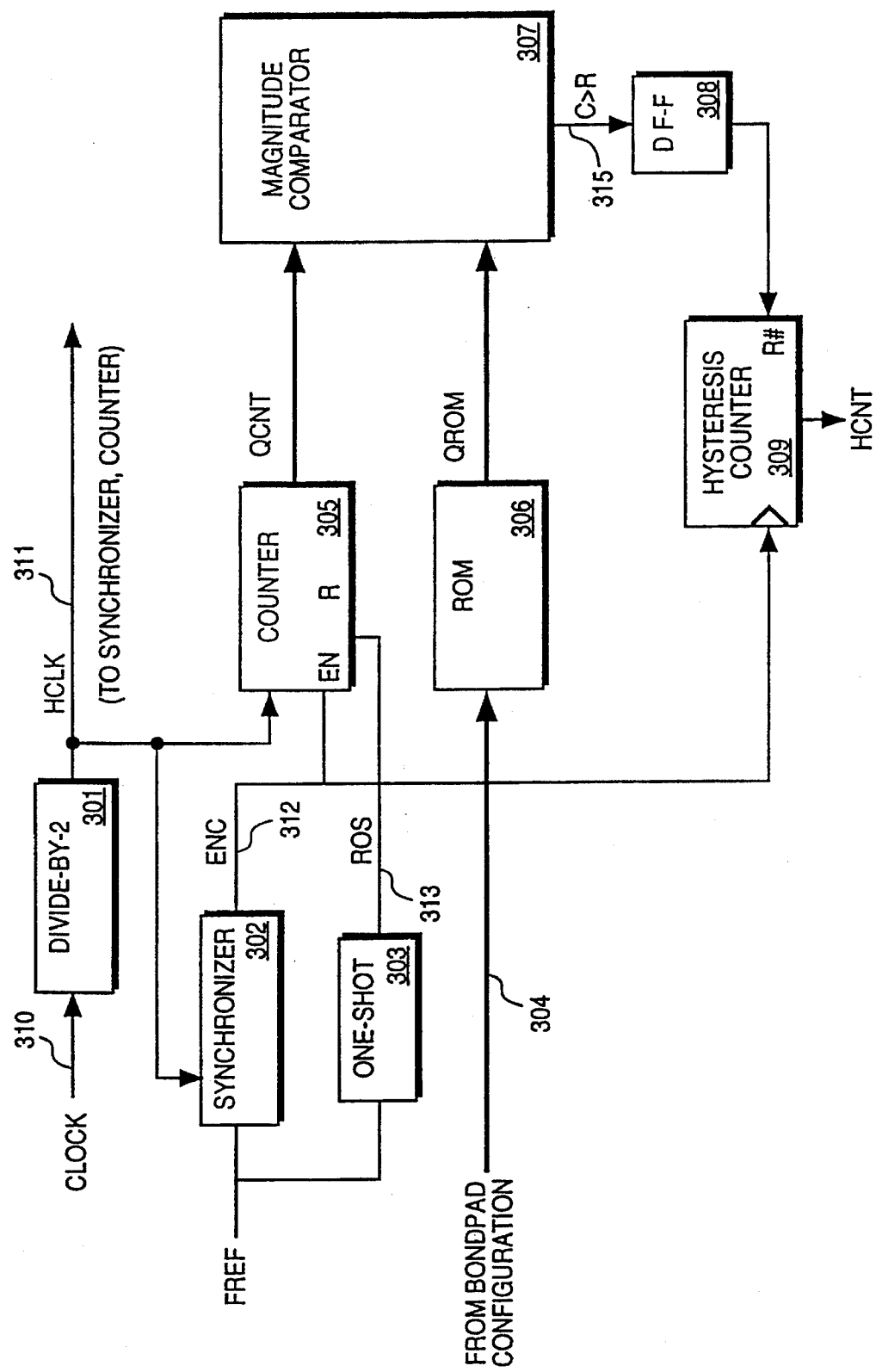
FIG. 3 is a block diagram of the decision generator with a clock speed limiter of the present invention.

Once a stable, digital and temperature independent frequency reference FREF is obtained, a decision generator shown in FIG. 3 compares the frequency reference to the input clock signal.

The Decision Generator of the Present Invention

Referring to FIG. 3, the input clock 310 is coupled as an input of divide-by-2 301. The output of divide-by-2 310 is an HCLK clock signal 311. Synchronizer 302 is coupled to receive the HCLK signal 311 and the frequency reference (FREF) signal. The output of synchronizer 302 as well as the HCLK signal 311 are coupled to inputs of counter 305. The output of counter 305 is coupled as an input of magnitude comparator 307. The other input to magnitude comparator 307 is coupled to the output of ROM 306, which is output in response to bondpad configuration signal 304. The output of magnitude comparator 307 is a C>R signal that is input into D flip-flop 308. D flip-flop 308 is clocked a ROS signal 313 output from one shot 303. One shot 303 operates in response to the frequency reference (FREF) signal and also generates the reset input to counter 305. The output of the D flip-flop 308 is a Q1 signal 314 that is coupled to the input of hysteresis counter 309. Hysteresis counter 309 is clocked by the synchronized version of the FREF signal output from synchronizer 302 and produces the HCNT signal used to disable the integrated circuit when the input clock is faster than the frequency range permitted.

Clock signal 310 is input to the integrated circuit to clock components within the integrated circuit. Clock signal 310 governs the rate of data transfer from one flip-flop to the next. Clock signal 310 is input to a divide-by-2 301 to produce a divided-by-2 version of the clock, referred to herein as the HCLK signal 311. The HCLK signal 311 contains the external input frequency information that is used to clock counter 305 and is used by synchronizer 302. By having clock signal 310 undergo the divide-by-2 operation, the present invention may employ slower components in the decision generator. If the decision generator is configured with faster operating components, then the divide-by-2 operation may not be necessary.

The synchronizer 302 synchronizes the HCLK signal 311 to the FREF signal input from the frequency generator of the present invention. If the FREF and HCLK signal 311 were synchronized, then synchronizer 302 would not be required. The synchronized version of the FREF, referred herein as the ENC signal 312, enables counter 305. Counter 305 also receives the HCLK signal 311. When the ENC signal 312 is high, counter 305 is enabled and counts each clock cycle of the HCLK. Thus, counter 305 advances when the FREF signal is high and the HCLK signal 311 toggles.

At the end of the high time of the FREF signal, the count contained in counter 305, referred to as the QCNT signal, is compared against a predetermined value, referred to as QROM, output from ROM 306, using magnitude comparator 307. If the QCNT output of counter 305 is larger than the predetermined value, then the C>R signal 315 is activated.

The one shot 303 is coupled to receive the frequency reference signal FREF and generates the ROS signal 313. The ROS signal 313 is a one shot generated just before the rising edge of the synchronized FREF signal. The ROS signal 313 resets counter 305 to zero before it begins counting and at each time the rising edge of the synchronized FREF signal occurs. The ROS signal 303 also latches the last value of the C>R signal output from magnitude comparator 307 into a D flip-flop 308. The output of the D flip-flop 308, referred to as a Q1 signal 314, signifies that the speed of the input clock 310 has exceeded the value allowed in ROM 306 during the last FREF cycle.

To ensure correct detection, a hysteresis counter 309 is included in one embodiment. Hysteresis counter 309 is clocked by the ENC signal and is enabled only when the Q1 signal 314 is high. Otherwise, hysteresis counter 309 resets to zero. In this embodiment, hysteresis counter 309 counts for eight consecutive FREF cycles before a "speed violation" is determined to have occurred. At that time, the third most significant bit (MSB) of the output signal HCNT from hysteresis counter 309 is activated. Thus, the function of hysteresis counter 309 is to ensure the a real violation is detected, not momentary false ones such as may be due to noise. In alternative embodiments, a hysteresis counter may not be needed. Likewise, the number of consecutive FREF cycles chosen to ensure that a speed violation has occurred is a design choice.

The third most significant bit, referred to herein as the HCNT3 signal, or an equivalent signal version is subsequently used to disrupt the normal functionality of the integrated circuit. This intentional failure can be interpreted externally as a critical speed failure. Note that there are numerous ways well-known to those in the art in which the microprocessor or the integrated circuit may be disabled in response to such a signal. For instance, in response to such a signal, the processor can be forced to access the wrong microcode entry, resulting in a software error, or a control signal can be forced to remain at a logic value that results in erratic behavior.

It may be necessary for various speed grades to be personalized on different individual circuits of the same product type or integrated circuit type. In one embodiment, ROM 306 holds multiple values, each of which is representative to a different operating frequency limit. Different speed thresholds may be set by programming ROM 306. The bondpad signals 304 select the appropriate data in ROM 306. Thus, by programming the bondpads, a selection of a value in ROM may be made.

ROM 306 may be implemented using a simple register, particularly if only one speed grade is available. Also, other forms of programming may be provided to select one of multiple values for comparator 307. It may be feasible to incorporate programming as part of an EPROM or flash EPROM. In other embodiments, the programming may be performed on the fly through, for instance, software running in the computer system in which the integrated circuit is contained.

Figure 4:
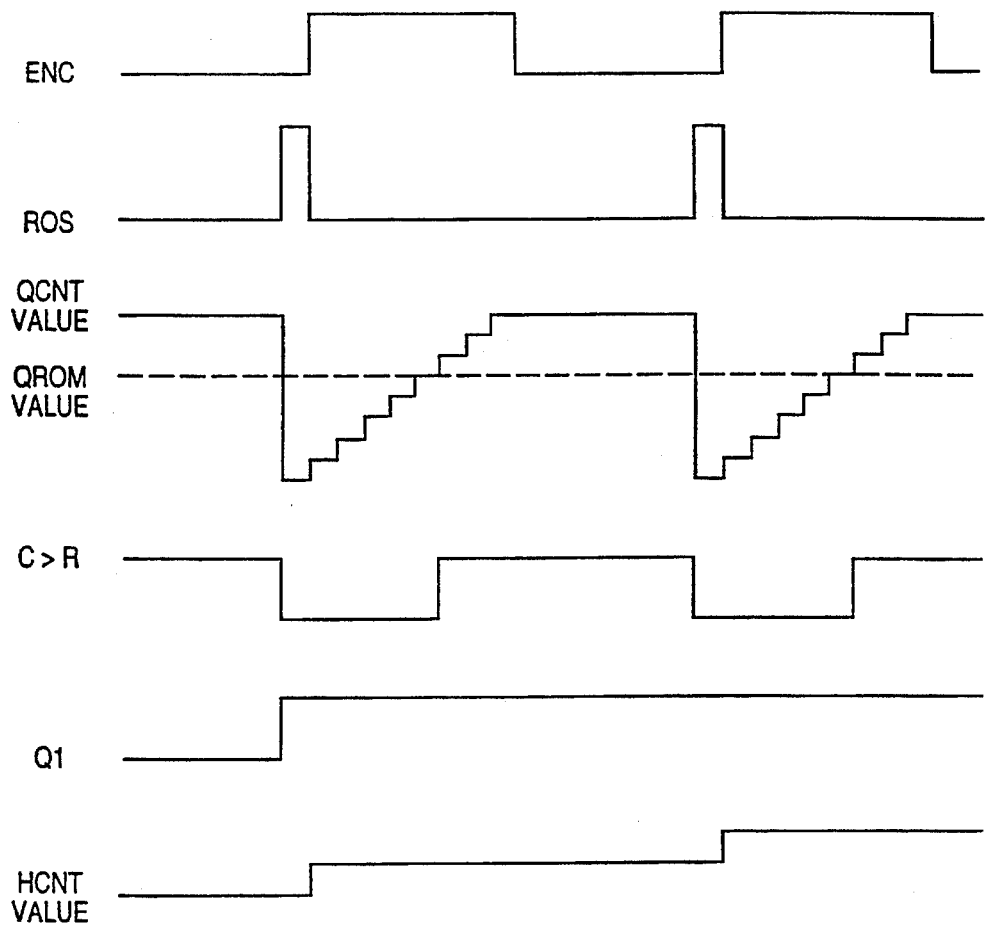
FIG. 4 are waveforms depicting the operation of the decision generator.

Exemplary waveforms generated through the use of the decision generator in FIG. 3 are shown in FIG. 4.

Basis for the Frequency Reference

In the present invention, the frequency reference FREF is power supply and temperature insensitive in order to allow tight speed grades to be programmed on an individual integrated circuit. Since the frequency reference FREF is an internal timing reference, a temperature independent resistor and capacitor must be available in the integrated circuit. MOS gate oxide capacitors are known to be temperature insensitive. To obtain a temperature independent resistor in a digital CMOS process, the present invention uses an independent current source with a temperature independent voltage to create a resultant "imaginary" resistor that is also temperature independent.

Temperature independent voltage sources are well-known in the art. In one embodiment of the present invention, the temperature independent voltage source is implemented as a bandgap voltage reference. In another embodiment, a Zener diode may be used to provide a temperature independent voltage source.

In one embodiment, the temperature independent current source (IREF) used in the present invention employs two resistor layers, none of which are required to have a zero temperature coefficient. The only requirements on the two resistors are that they have good predictable temperature coefficients, have good predictable absolute values, and that one of the two resistor layers has a temperature coefficient above 3356 parts per million, per degree centigrade (ppm/°C.) while the other has a temperature coefficient below 3356 ppm/°C. Note that the temperature coefficient refers to a constant number valid in the interested range of operation (i.e., the operating range of the integrated circuit).

Figure 5A:
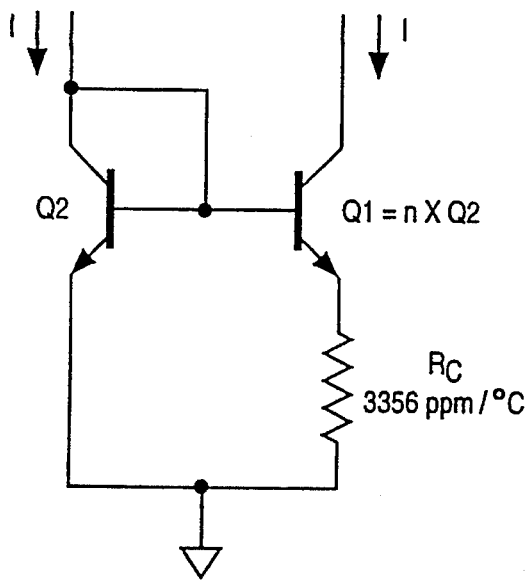
FIGS. 5A and 5B illustrates a circuit schematic and a graph supporting the derivation of the constant current under the present invention.
Figure 5B:
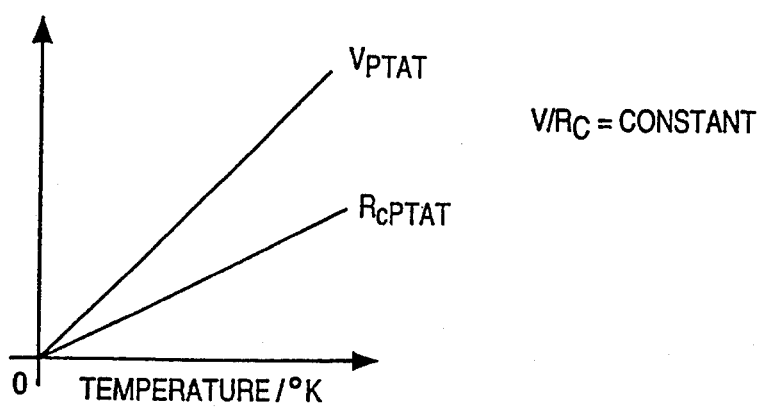

FIGS. 5A and 5B illustrate the independent current source (IREF) concept. Note that the term "PTAT" refers to herein as Proportional to Absolute Temperature. A PTAT resistor is a resistor with a temperature coefficient of 3356 ppm/°C.

A constant current I is derived by passing two identical currents to two bipolar devices, e.g., Q2, Q1 (=n×Q2), that are different in size. Because the bipolar transistors are different sizes, they have a different current density when identical currents are passed through them. This causes a difference of $V_{be}$. The difference in $V_{be}$ can be forced on a resistor, such as $R_c$. Resistor $R_c$ is a 3356 ppm/°C. resistor. The voltage across resistor $R_c$ is $\Delta V_{be} = V_{be} - V_{be1}$.

$$V_{be1} = (kT/q)\ln(I/I_{s1})$$
$$V_{be2} = (kT/q)\ln(I/I_{s2})$$

$$\begin{aligned}
I \times R_c &= V_{be2} - V_{be1} \\
&= (kT/q)\ln(I_{s1}/I_{s2}) \\
&= (kT/q)\ln(n) \\
I &= (kT/qR_c)\ln(n) \\
&= \frac{kT}{qR_c}\ln(n) \\
&= \frac{\frac{kT}{q}\ln(n)}{\alpha T} \\
&= \frac{k}{q\alpha}\ln(n)
\end{aligned}$$

Note in the equations above, $R_c$ equals $\alpha \times T$, where $\alpha$ is a constant.

The derivation above illustrates that if a PTAT voltage is dropped across a PTAT resistor, a temperature independent current results. FIG. 5B is a graph illustrating the relationship between voltage V and the resistor $R_c$ with respect to temperature where $V/R_c$ is a constant.

Figure 6:
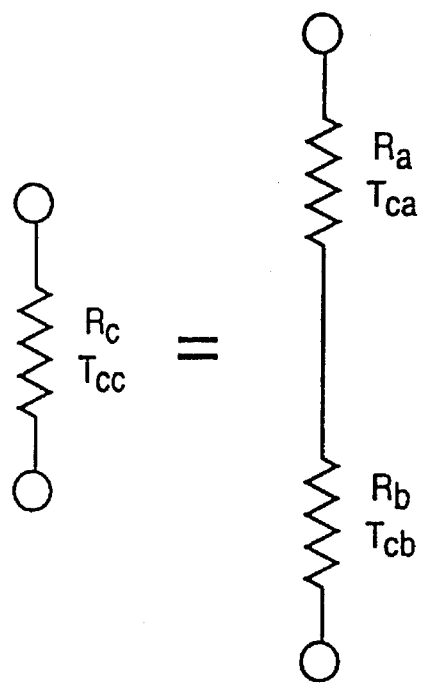
FIG. 6 illustrates a composite resistor of the present invention.

By combining two resistors in series, as shown in FIG. 6, one with a coefficient higher than 3356 ppm/°C. and the other lower, it is possible to size the resistors such than the effective coefficient of the equivalent resistor is 3356 ppm/°C.

In one embodiment of the present invention, the N-well and base layers are used for the two resistors in series. A pair of N-well and base resistor values is chosen to satisfy the following equation;

$$R_c = R_a + R_b$$

$$R_c T_{cc} = R_a T_{ca} + R_b T_{cb}$$

$$T_{cc} = \frac{R_a T_{ca} + R_b T_{cb}}{R_c}$$

Note that the above equation depicts the relationship between the temperature coefficient and the resistor. Non-idealities such as non-linear or inaccurate temperature coefficients will effect output accuracy.

Figure 7:
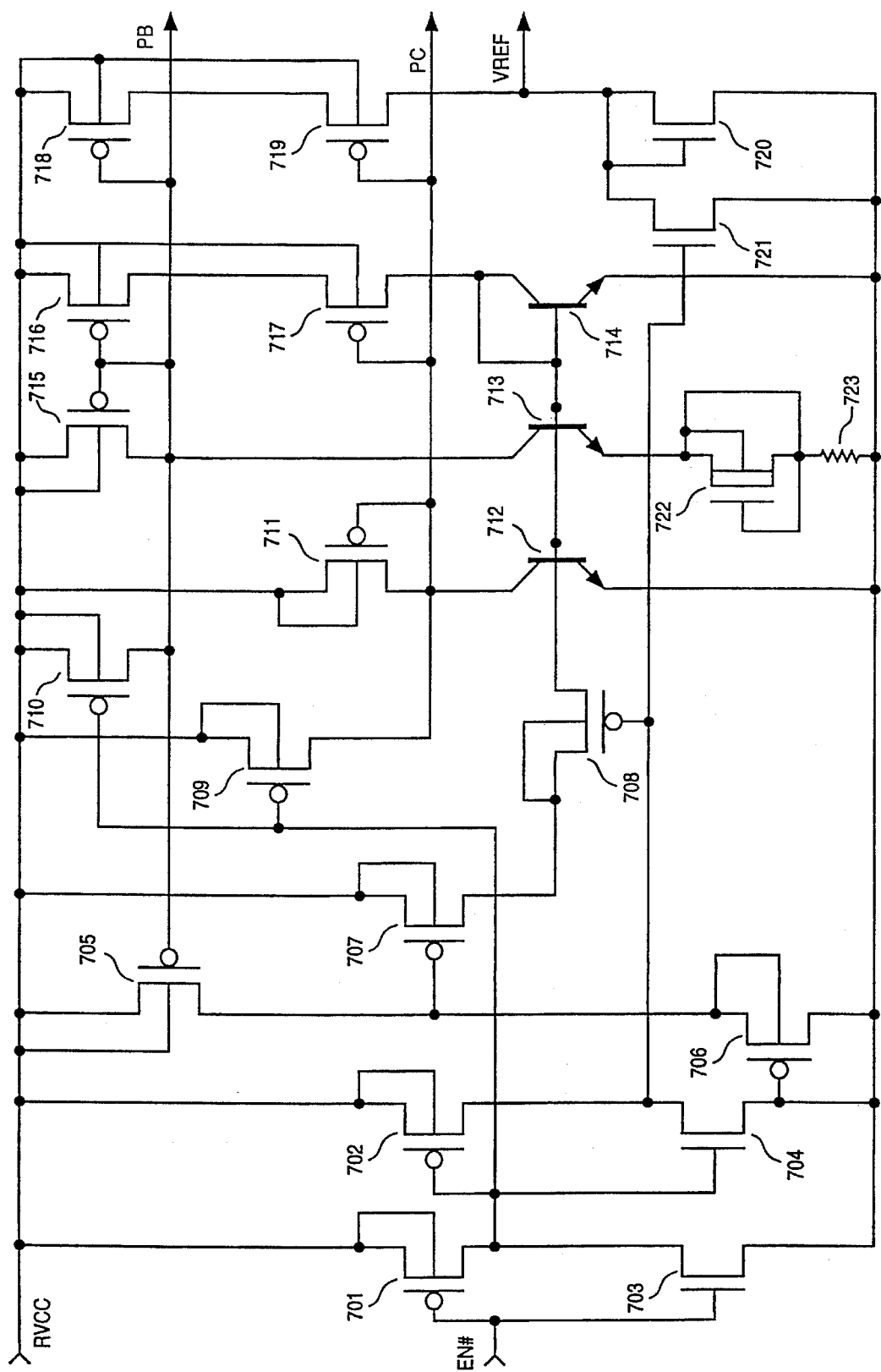
FIG. 7 is a circuit schematic for generating the reference current.

One embodiment of the schematic of the current reference circuit is shown in FIG. 7. The IREF current reference circuit comprises the following devices listed in Table 1 below:

TABLE 1

| Ref. No. | Device Type |
| --- | --- |
| 701 | p-channel transistor |
| 702 | p-channel transistor |
| 703 | n-channel transistor |
| 704 | n-channel transistor |
| 705 | p-channel transistor |
| 706 | p-channel transistor |
| 707 | p-channel transistor |
| 708 | p-channel transistor |
| 709 | p-channel transistor |
| 710 | p-channel transistor |
| 711 | p-channel transistor |
| 712 | bipolar transistor |
| 713 | bipolar transistor |
| 714 | bipolar transistor |
| 715 | p-channel transistor |
| 716 | p-channel transistor |
| 717 | p-channel transistor |
| 718 | p-channel transistor |
| 719 | p-channel transistor |
| 720 | n-channel transistor |
| 721 | n-channel transistor |
| 722 | base resistor |
| 723 | Resistor (transistor) |

The PB and PC outputs represent cascoded PMOS current source, while the VREF output represents a non-cascoded NMOS current source. The PB and PC outputs may be the output of constant current reference 110. The operation of the elements in the circuit described in FIG. 7 is well-known to those skilled in the art.

Figure 8:
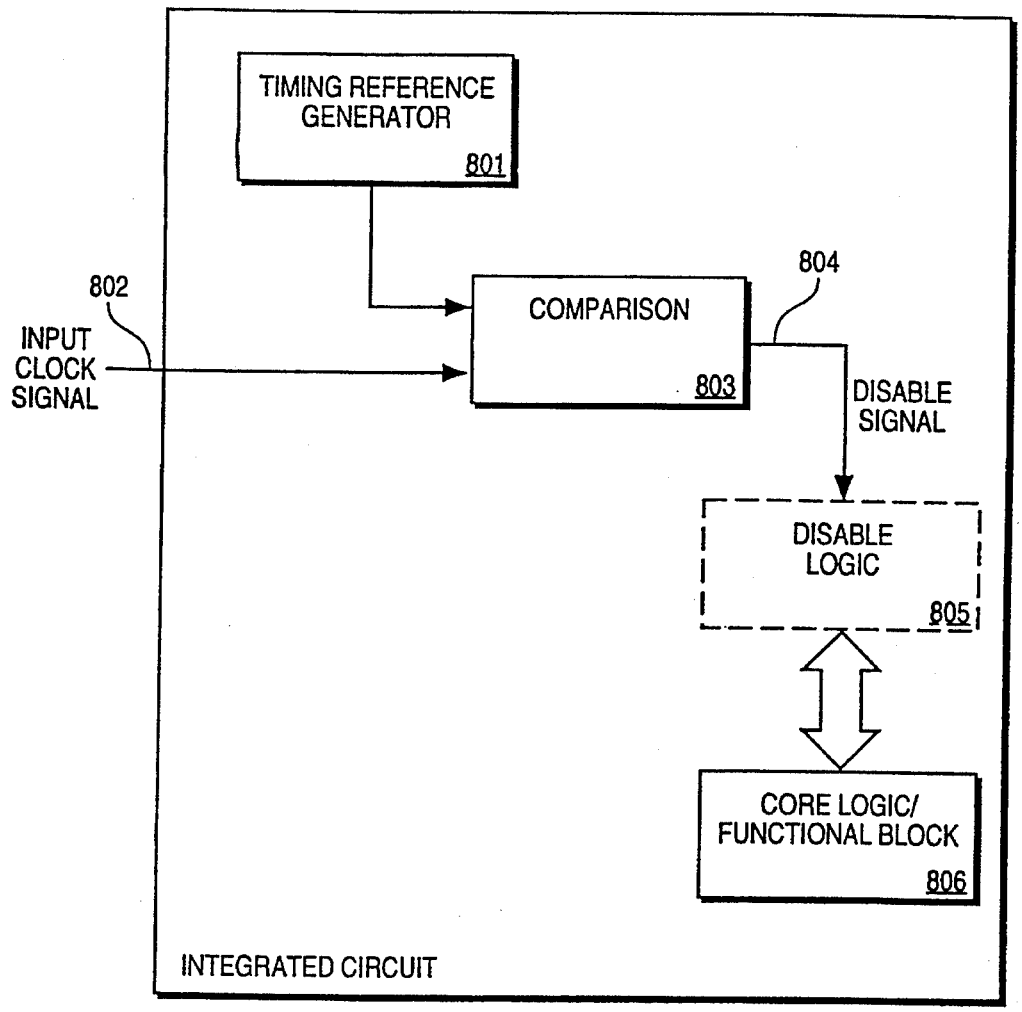
FIG. 8 is a block diagram of one embodiment of an integrated circuit according to the present invention.

FIG. 8 is a block diagram of one embodiment of an integrated circuit according to the present invention. Referring to FIG. 8, the integrated circuit comprises a timing reference generator 801, comparison block 803 and core logic/function block 806. Optionally, the integrated circuit may include disable logic 805.

Core 806 provides one or more functions. For instance, when the integrated circuit comprises a microprocessor, the functions include fetching, decoding and executing instructions as part of one or more execution pipelines. The comparison block 803 compares the external input clock signal 802 with a timing reference generated by timing reference generator 801, in a manner described above. Based on the results of the comparison, comparison block 803 asserts disable signal 804. Note that disable signal 804 may be active high (e.g., 1) or active low (e.g., 0).

The disable signal 804 may be received by core 806 directly. In one embodiment, the disable signal 804 may be received by disable logic 805 which in turn controls the disrupting of core 806. Note that the functionality to disable/disrupt core 806 is well-known in the art.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a clock speed limiter has been described.

We claim:

1. An apparatus for disabling the operation of an integrated circuit operating under control of an input clock signal, said apparatus comprising:

a timing reference generator generating a timing reference having a frequency that is substantially constant with temperature, wherein the timing reference generator generates the timing reference using a bandgap voltage reference and a constant current reference; and a comparison circuit coupled to receive the timing reference and the input clock signal comparing a predetermined frequency to the input clock signal during a predetermined logic state of the timing reference and providing a disable signal for disabling the integrated circuit when the frequency of the input clock signal exceeds the predetermined frequency.

2. The apparatus defined in claim 1 wherein the timing reference generator further comprises a capacitor sourced by the constant current reference to obtain a voltage ramp, and further wherein the timing reference generator terminates the voltage ramp when the voltage ramp reaches the bandgap voltage, such that repeatedly obtaining and terminating the voltage ramp produces a signal upon which the timing reference is based.

3. An apparatus for disabling the operation of an integrated circuit operating under control of an input clock signal, said apparatus comprising:

a timing reference generator generating a timing reference having a frequency that is substantially constant with temperature, wherein the timing reference generator comprises a capacitor;

a constant current source coupled to charge the capacitor, such that the capacitor generates a first potential;

a trip point reference generating a second potential;

a comparator coupled to compare the first potential and the second potential to produce an output, wherein the output is in a first state while the second potential exceeds the first potential and flips to a second state when the first potential exceeds the second potential;

a discharge mechanism coupled to the capacitor and responsive to the output of the comparator to discharge the capacitor when the output is in the second state, such that the output flips back to the first state; and a comparison circuit coupled to receive the timing reference and the input clock signal comparing a predetermined frequency to the input clock signal during a predetermined logic state of the timing reference and providing a disable signal for disabling the integrated circuit when the frequency of the input clock signal exceeds the predetermined frequency, wherein the charging and discharging occur repeatedly to generate a stable frequency at the output of the comparison circuit, upon which the timing reference is based.

4. The apparatus defined in claim 1 wherein the comparison circuit counts external clock cycles of the input clock signal that occur during a period of the timing reference to produce a count, and compares the count to a predetermined value, such that the comparison circuit generates the disable signal if the count exceeds the predetermined value.

5. The apparatus defined in claim 4 further comprising a memory storing the predetermined value.

6. The apparatus defined in claim 5 wherein the memory comprises a read-only memory (ROM).

7. The apparatus defined in claim 1 further comprising a memory storing a plurality of values, and wherein the comparison circuit counts external clock cycles of the input clock signal that occur during a period of the timing reference to produce a count, and compares the count to one of the plurality of values, such that the comparison circuit generates the disable signal if the count exceeds said one of the plurality of values.

8. The apparatus defined in claim 7 wherein each of the plurality of values is indicative of a different speed.

9. The apparatus defined in claim 8 wherein the comparison circuit is programmed to select said one of the plurality of values.

10. The apparatus defined in claim 9 wherein the comparison circuit is programmed by bondpad options.

11. The apparatus defined in claim 9 wherein the comparison circuit is programmed dynamically while receiving the input clock signal.

12. An apparatus for disabling the operation of an integrated circuit operating under control of an input clock signal, said apparatus comprising:

frequency reference generation means for generating a frequency reference having a frequency that is substantially constant with temperature, wherein the frequency reference generation means generates the frequency reference using a bandgap voltage reference and a constant current reference; and comparing means coupled to receive the frequency reference and the input clock signal for comparing a predetermined frequency to the input clock signal during a predetermined logic state of the frequency reference and for providing a disable signal for disabling the integrated circuit when the frequency of the input clock signal exceeds the predetermined frequency.

13. The apparatus defined in claim 12 wherein the frequency reference generation means comprises:

a capacitor;

current source generation means for changing the capacitor, such that the capacitor generates a first potential;

trip point reference generation for generating a second potential;

comparing means for comparing the first potential and the second potential to produce an output, wherein the output is in a first state while the second potential exceeds the first potential and flips to a second state when the first potential exceeds the second potential;

a discharging means coupled to the capacitor and responsive to the output of the comparator for discharging the capacitor when the output is in the second state, such that the output flips back to the first state;

wherein the charging and discharging occur repeatedly to generate a stable frequency at the output of the comparing means, upon which the timing reference is based.

14. An integrated circuit comprising:

a core performing one or more functions in response to an input clock signal; and a clock speed limiter coupled to the core to prevent the core from operating above a predetermined frequency, wherein the clock speed limiter compares the input clock signal to the predetermined frequency using a substantially temperature independent timing reference, wherein the clock speed limiter comprises a timing reference generator generating the timing reference having a frequency that is substantially constant with temperature, wherein the timing reference generator generates the timing reference using a bandgap voltage reference and a constant current reference, and a comparison circuit coupled to receive the timing reference and the input clock signal comparing the predetermined frequency to the input clock signal during a predetermined logic state of the timing reference and providing a disable signal for disabling the integrated circuit when the frequency of the input clock signal exceeds the predetermined frequency.

15. The integrated circuit defined in claim 14 wherein the timing reference generator comprises:

a capacitor;

a constant current source coupled to charge the capacitor, such that the capacitor generates a first potential;

a trip point reference generating a second potential;

a comparator coupled to compare the first potential and the second potential to produce an output, wherein the output is in a first state while the second potential exceeds the first potential and flips to a second state when the first potential exceeds the second potential;

a discharge mechanism coupled to the capacitor and responsive to the output of the comparator to discharge the capacitor when the output is in the second state, such that the output flips back to the first state;

wherein the charging and discharging occur repeatedly to generate a stable frequency at the output of the comparator, upon which the timing reference is based.

16. The integrated circuit defined in claim 15 wherein the trip point reference comprises a bandgap reference.

17. The integrated circuit defined in claim 15 wherein the constant current source comprises a constant current reference.

18. The integrated circuit defined in claim 15 wherein the discharge mechanism comprises a transistor.

19. The integrated circuit defined in claim 15 further comprising a divider coupled to the output of the comparison circuit to produce the timing reference based on the output of the comparison circuit.

20. The integrated circuit defined in claim 19 wherein the divider comprises a divide-by-2.

21. A method for limiting operating speed of an integrated circuit (IC) clocked by an input clock signal, said method comprising the steps of:

generating a frequency reference, wherein the step of generating the frequency reference comprises repeatedly;

obtaining a voltage ramp by sourcing a constant current to a gate capacitor, and terminating the voltage ramp when the voltage ramp reaches a bandgap reference level;

comparing a predetermined frequency to the frequency of the input clock signal during a predetermined logic state of the frequency reference; and preventing the IC from operating if the input clock signal frequency is greater than the predetermined frequency.

22. The method defined in claim 21 wherein the step of comparing comprises the steps of:

counting a number of clock cycles of the input clock that occur during a period of the frequency reference to obtain a count; and comparing the count to a predetermined value, wherein the IC is prevented from operating if the count exceeds the predetermined value.

23. An apparatus for disabling the operation of an integrated circuit operating under control of an input clock signal, said apparatus comprising:

a timing reference generator generating a timing reference having a frequency that is substantially constant with temperature, wherein the timing reference generator comprises a capacitor;

a constant current source coupled to charge the capacitor, wherein the constant current source comprises a constant current reference to generate a current to charge the capacitor to generate a first potential;

a bandgap voltage reference generating a second potential, wherein the second potential is non-zero;

a comparator coupled to compare the first potential and the second potential to produce an output, wherein the output is in a first state while the second potential exceeds the first potential and flips to a second state when the first potential exceeds the second potential;

a discharge mechanism coupled to the capacitor and responsive to the output of the comparator to discharge the capacitor when the output is in the second state causing the first potential received by the comparator to be pulled to ground, such that the output flips back to the first state;

wherein the charging and discharging occur repeatedly, such that the output of the comparator comprises a frequency reference signal that has a stable frequency that is independent of temperature and acts as the timing reference; and a comparison circuit coupled to receive the timing reference and the input clock signal comparing a predetermined frequency to the input clock signal during a predetermined logic state of the timing reference and providing a disable signal for disabling the integrated circuit when the frequency of the input clock signal exceeds the predetermined frequency.

24. The apparatus defined in claim 23 wherein the constant current source comprises a constant current reference.

25. The apparatus defined in claim 23 wherein the discharge mechanism comprises a transistor.

26. The apparatus defined in claim 23 further comprising a divider coupled to the output of the comparator to produce the timing reference based on the output of the comparator.

27. The apparatus defined in claim 26 wherein the divider comprises a divide-by-2.

28. An apparatus for limiting the speed of an integrated circuit (IC) externally clocked by an input clock signal, said apparatus comprising:

a frequency reference generator, located on the integrated circuit, generating a frequency reference signal that is substantially independent of temperature and process variations on the integrated circuit, wherein the frequency reference generator generates the frequency reference using a bandgap voltage reference and a constant current reference;

a counter, located on the integrated circuit, coupled to receive the frequency reference signal and the input clock signal to count clock cycles of the input clock signal that occurs during a period of the frequency reference signal;

a storage device, located on the integrated circuit, providing a predetermined value;

a comparator, located on the integrated circuit, coupled to receive and compare the count and the predetermined value to generate an output signal, wherein the output signal is at a first state when the count exceeds the predetermined value; and a disable signal generator, located on the integrated circuit, to generate a disable signal in response to the output signal being at the first state to prevent the IC from operating.

29. The apparatus defined in claim 28 wherein the comparator comprises a magnitude comparator.

30. The apparatus defined in claim 28 wherein the storage device comprises a read-only memory (ROM).

31. The apparatus defined in claim 28 further comprising a synchronizer to synchronize the frequency reference to the input clock signal.

32. The apparatus defined in claim 28 wherein the predetermined value comprises one of a plurality of speed counts stored in the storage device and indicative of clock speeds, wherein the storage device is programmed to provide the predetermined value.

33. The apparatus defined in claim 32 wherein the storage device is programmed with a bondpad configuration.

34. The apparatus defined in claim 28 further comprises a hysteresis counter responsive to the output signal, wherein the disable signal is generated by the disable signal generator only after a predetermined number of occurrences of the output signal being in the first state.

35. The apparatus defined in claim 34 further comprising a reset signal resetting the counter and the output signal after each period of the frequency reference.

36. An apparatus for disabling the operation of an integrated circuit operating under control of an input clock signal, said apparatus comprising:

a timing reference generator generating an internally generated reference signal having a frequency that is substantially independent of temperature, wherein the timing reference generator generates the internally generated reference signal using a bandgap voltage reference and a constant current reference; and a comparison circuit coupled to receive the internally generated reference signal and the input clock signal to compare a predetermined frequency to the input clock signal using the internally generated reference signal as a timing reference, wherein the comparison circuit further provides a disable signal for disabling the integrated circuit when the frequency of the input clock signal exceeds the predetermined frequency.

37. The apparatus defined in claim 36 wherein the comparison circuit counts each clock cycle of the input clock signal while the internally generated reference signal is in a predetermined logic state in order to generated a count and compares the count to a predetermined value, wherein the comparison circuit generates the disable signal if the count indicates that the frequency of the input clock signal exceeds the predetermined frequency.

* * * * *